Jan. 28, 1936.    C. J. HANSEN    2,029,262
REMOVAL OF HYDROGEN SULPHIDE AND AMMONIA FROM GASES
Filed Jan. 25, 1932
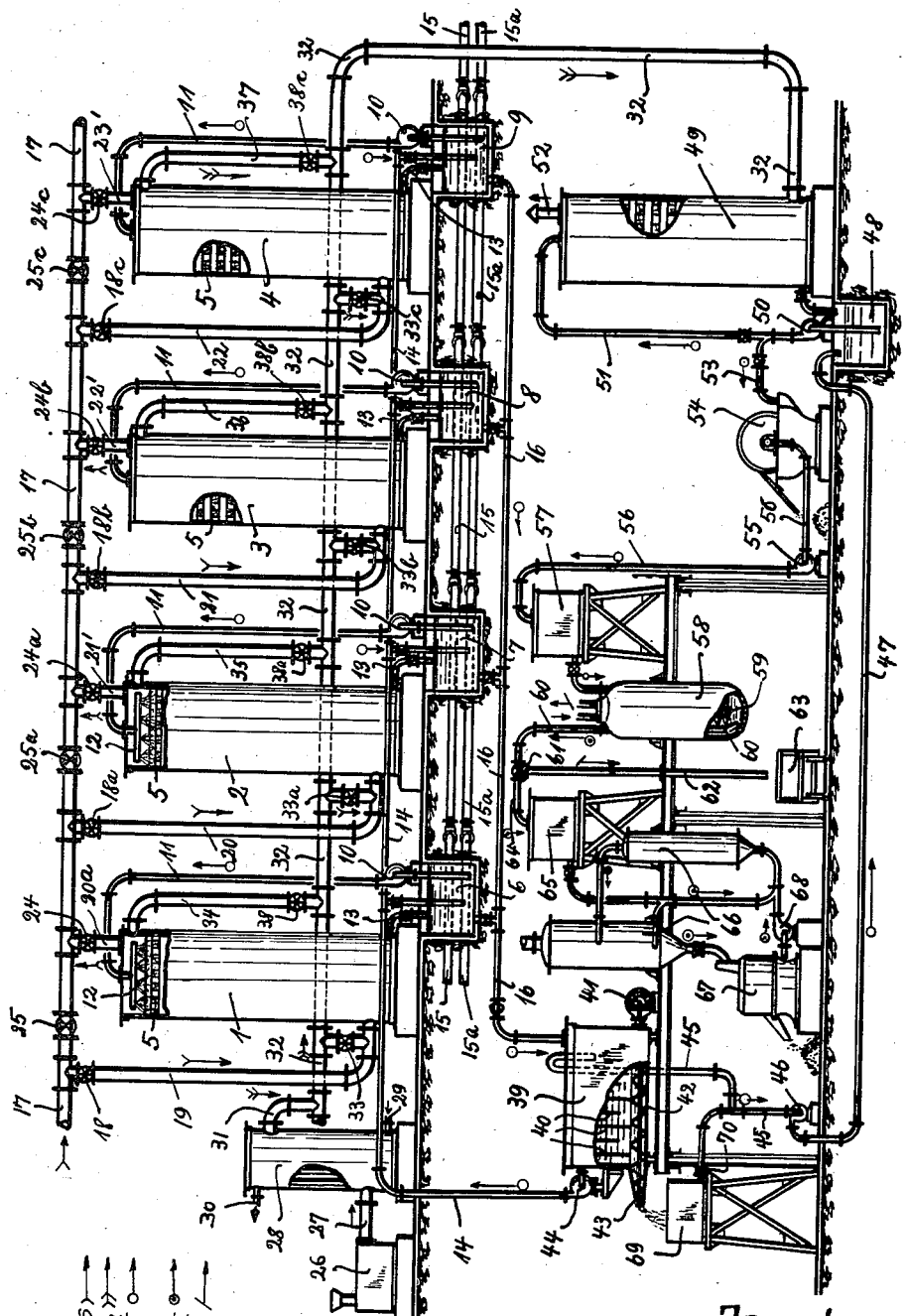
Inventor:

UNITED STATES PATENT OFFICE 2,029,262

REMOVAL OF HYDROGEN SULPHIDE AND AMMONIA FROM GASES

Christian Johannes Hansen, Essen-Ruhr, Germany, assignor, by mesne assignments, to The Koppers Company of Delaware, Pittsburgh, Pa., a corporation of Delaware Application January 25, 1932, Serial No. 588,794
In Germany January 24, 1931

2 Claims. (Cl. 23—225)

(Granted under the provisions of sec. 14, act of March 2, 1927; 357 O. G. 5)

The present invention relates to the removal of hydrogen sulphide and ammonia from gases, for instance coal distillation gases and more particularly to the removal of ammonia and hydrogen sulphide from gases, whereby the gases to be cleaned are brought into contact with solutions of thionates, which absorb ammonia and hydrogen sulphide.

The removal of ammonia and hydrogen sulphide from gases by means of thionate solutions is already known. In the case of the thionate gas purification process there are two different groups between which an essential distinction is to be drawn. In the one case, viz. in the so-called metal thionate process, thionates of those metals are employed for treating the gases to be purified, the sulphides of which are insoluble and on the other hand in the so-called polythionate process, a solution of the polythionates of such metals are employed for the purification of which the sulphides are soluble in water.

In the case of the metal thionate processes, ammonia and hydrogen sulphide are principally absorbed according to the following reaction equation, which is set out for the iron sulphate, but may be analogously applied also to the other metal thionates, for instance manganese- or zincthionates.

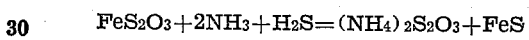

$$FeS_2O_3 + 2NH_3 + H_2S = (NH_4)_2S_2O_3 + FeS$$

In the case of the polythionate process, ammonia and hydrogen sulphide are absorbed principally according to the following equation:

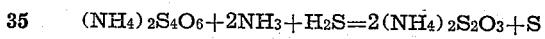

$$(NH_4)_2S_4O_6 + 2NH_3 + H_2S = 2(NH_4)_2S_2O_3 + S$$

In the two above named cases, ammonia and hydrogen sulphide are simultaneously absorbed. It is, however, also possible by means of the thionate process to only wash out hydrogen sulphide. In this case, there takes place essentially the following reactions:

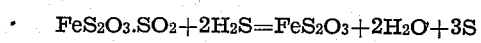

$$FeS_2O_3 \cdot SO_2 + 2H_2S = FeS_2O_3 + 2H_2O + 3S$$

$$(NH_4)_2S_4O_6 + 3H_2S = (NH_4)_2S_2O_3 + 3H_2O + 5S$$

From the reaction equations given above, it is to be seen that on carrying out any thionate gas purification process by the absorption of the ammonia or the hydrogen sulphide or both, solid bodies are precipitated in the washing solution, i. e. in the one case iron sulphide and in the other cases elementary sulphur.

Now it is customary to make use of the so-called hurdle washers for carrying out the thionate gas purification process, i. e. high preferably cylindrical towers fitted with wooden hurdles or the like, onto which the washing fluid is sprayed from above, whereas the gas to be cleaned is led over in counter-current from below upwards through the tower, passing through the descending washing fluid.

Such hurdle washers are especially suitable for carrying out the thionate process, because in same the gas and the washing fluid are brought into contact with one another over a very large surface. However, there results in the case of the thionate gas purification process, for the carrying out of which the hurdle washers are made use of, a considerable disadvantage in that the solid bodies which separate out of the washing fluid, are deposited on the hurdles of the washing tower, which lead to the free surface of the washer being considerably reduced or lead possibly to the complete stopping up of the washer.

One object of my present invention is to provide an improved thionate gas purification process in connection with which a permanent stopping up of the hurdle washers is not possible.

According to my present invention, I proceed for this purpose principally so that I remove the unavoidable deposits of sulphide of iron or sulphur on the hurdle washers by continuously or intermittently bringing about such a reaction in the respective washer, so that the sulphur or the iron sulphide is dissolved, said reaction being necessary in any case for the carrying out of the thionate gas purification process, viz. for the regeneration of the washing fluid.

It is well-known that the regeneration of the spent washing fluid in the case of all thionate gas purification processes are so carried out that the spent fluid is treated with sulphur dioxide. In the case of the metal thionate process or of the polythionate process, the reactions mainly are indicated by the following equations:

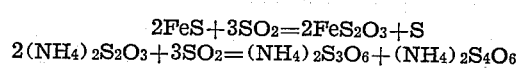

$$2FeS + 3SO_2 = 2FeS_2O_3 + S$$
$$2(NH_4)_2S_2O_3 + 3SO_2 = (NH_4)_2S_3O_6 + (NH_4)_2S_4O_6$$

According to my present invention, I now allow the above reactions to proceed alternately during one period in one of those washing towers, which have served before for the absorption of ammonia and hydrogen sulphide from the gases and in which the iron sulphide or sulphur or possibly both bodies have been deposited. From the above equations it can be seen that in this case the iron sulphide deposited on the hurdles of the gas purification washer is converted by the sulphur dioxide into soluble metal thiosulphate.

In order to remove also the sulphur resulting during the process of washing in the polythionate process or in the regeneration of the metal sulphides to metal thiosulphates, I add according to my present invention to the fluid which is treated with sulphur dioxide some ammonia. The ammonia combines with the sulphur dioxide and forms ammonium sulphite or ammonium bisulphite or a mixture of these two bodies. These compounds react then with the sulphur present in the washer for instance according to the following equation:

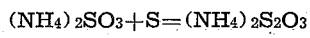

$$(NH_4)_2SO_3 + S = (NH_4)_2S_2O_3$$

forming soluble ammonium thiosulphate, which possibly is converted later by the sulphurous acid entirely or partly into polythionate.

One will recognize that according to the manner of working, set out in the present invention, in each case from the insoluble solid bodies which deposit on the hurdle washers, soluble metal salts or soluble ammonium compounds of the sulphur oxygen acids (thionates) are formed and in this manner it is possible without any difficulty to clean the hurdles of the purification washers from any insoluble solid bodies.

A further object of my present invention is to provide an improved apparatus for carrying out the thionate process, which permits to working the gas purification in technical practice according to the rules, set out in this invention.

With the above and other objects of my invention in view, I will now describe the nature of my present invention in connection with the accompanying drawing.

On the drawing there is shown diagrammatically in a side view and partly in longitudinal section suitable apparatus for carrying out the process according to this invention.

The apparatus shown consists essentially of four towers 1, 2, 3, and 4, which are fitted with usual wooden hurdles 5. Underneath of each washing tower there is a liquid container 6, 7, 8 or 9, from which the washing fluid by means of the pump 10 is carried forward through the pipe line 11 to one of the liquid distributing contrivances 12, fitted at the upper end of each washing tower, whereas the washing fluid arriving at the bottom of the washing tower runs off back again through the pipe line 13 to the respective liquid tank.

The four liquid tanks 6, 7, 8 or 9 are connected up with one another by the pipe lines 14, 15, 15a, and 16, the function of which will be later discussed. It may, however, be remarked here, that the connections of the pipe lines 14, 15, 15a, and 16 running to the liquid tanks 6, 7, 8, and 9 are controlled by valves and this in such a way that one can at will connect the various liquid tanks 6, 7, 8, and 9 with one another or shut off from one another.

The gas to be purified is led to one end of the pipe line 17, and is drawn off finally from the other end of the pipe line 17. The pipe line 17 is connected up with the lower end of each of the washers 1, 2, 3, and 4 by pipe lines 19, 20, 21 or 22 controlled by valves 18, 18a, 18b, and 18c. The washers 1, 2, 3, and 4 are connected up further with the pipe line 17 by means of the connecting pipe lines 20', 21', 22', and 23', which are controlled by the valves 24, 24a, 24b, and 24c. Finally, there is provided in the section of the pipe line 17 between the connection up points of the piping 19, 20, 21, and 22 and of the pipe lines 20', 21', 22', 23', in each case a shut-off valve 25, 25a, 25b, and 25c.

As can be seen from the drawing, the above mentioned pipe lines permit the gas to be cleaned to be led forward at choice through the various washers 1, 2, 3, and 4, whereby from time to time any one of these washing towers can be shut-off from the gas pipe line, so that in the respective washing towers a reaction for the dissolving of the deposits may be carried out.

On the one side close to the washer group 1, 2, 3, and 4 a sulphur burner 26 is installed for the production of sulphur dioxide gas. The sulphur dioxide gas escaping from the oven 26 is led forward through the pipe line 27 to a customary tubular cooler 28, to which cooling water is led forward through the pipe line 29 and from which the cooling water is led off through the pipe line 30.

The cooler 28 can with advantage also be used to treat the sulphur dioxide gas with sulphurous acid or in any other suitable manner in order to remove the sulphur trioxide from same.

The cooled and purified sulphur dioxide gas passes then from the cooler 28 through the pipe line 31 into a pipe line 32, which extends the length of the washing tower group. The pipe line 32 is connected up with pipes controlled by the valve 33, 33a, 33b, and 33c connecting with the lower end of the gas pipe line 19, 20, 21, and 22 and thereby also with the lower end of the washing towers 1, 2, 3, and 4. Furthermore, the sulphur dioxide gas pipe line 32 is connected up also by the pipe lines 34, 35, 36, and 37, controlled by the valves 38, 38a, 38b, and 38c, with the upper end of each of the washing towers 1, 2, 3, and 4. These connecting pipe lines between the sulphur dioxide gas pipe line 32 and the washing towers 1, 2, 3, and 4 render it possible to pass the sulphur dioxide gas similarly as the gas to be purified in any chosen order through one or the other of the washers 1, 2, 3, and 4.

The spent washing fluid can be led forward from any one of the liquid tanks 6, 7, 8, and 9 through the pipe line 16 to a contrivance 39, which consists of a large preferably square tank, in which a row of intermediate baffles 40 are provided serving to settle the current of the fluid in the inside of the vessel 39. In this way the solid bodies contained in the fluid are precipitated on the bottom of the contrivance 39, from where they are carried off by means of a screw conveyor 42, driven by a motor 41 and discharged at 43 from the tank 39, whereas the clarified mixtures by means of the pump 44 are driven under pressure into the pipe line 14 and through same to any of the tanks 6, 7, 8, and 9.

Another part of the clarified fluid flows from the tank 39 through the pipe line 45 to a pump 46, by means of which it is carried forward through the pipe line 47 to a tank 48 of the washing tower 49. The washing tower 49 serves to convert the ammonium thionate formed in all thionate processes entirely or partly into ammonium polythionate for the purpose of producing ammonium sulphate and sulphur from the ammonium thiosulphate. For this purpose the lower end of the washing tower 49 is connected up with the sulphur dioxide pipe line 32 and a pump 50 is provided by means of which the ammonium thiosulphate solution can be circulated from the tank 48 through the pipe line 51 into the upper end of the washing tower 49 and back again. The tower 49 is further provided bleeder 52 for exhaust of the spent $SO_2$ gas.

As soon as the liquid, which is held in circulation in the tower 49, has the necessary composition for the conversion into ammonium sulphate and sulphur, it is led forward through the pipe line 53 controlled by a valve to a drum filter 54 in which the sulphur is separated from solution. The solution goes from there by means of the pump 55 through the pipe line 56 to a tank 57 from which it is drawn off periodically in a pressure vessel 58. In the pressure vessel 58, the liquid is preferably heated up under pressure to temperatures above 150°, to which purpose the vessel 58 is fitted up with heating coils 59. During the heating up under pressure, ammonium sulphate solution and sulphur are formed. The latter collects at the lower part of the pressure vessel 58 from which it is drawn off by means of the pipe line 60 and a three-way-valve 61 through the pipe line 62 into the sulphur solidifying box 63. As soon as the sulphur from the pressure vessel 58 is removed, the valve 61 can again be so adjusted that the fluid passes through the pipe line 64 to a tank 65, from which it flows off periodically or continuously to an ordinary evaporating contrivance 66, in which the fluid is evaporated until ammonium sulphate crystals settle out. The salt separated out is drained in a centrifugal 67 from the mother liquor which by means of the pump 68 is carried back to the evaporating contrivance 66.

The solid bodies carried from the contrivance 39 by means of the worm 42 go forward to a tank 69, from which they may be removed continuously or intermittently and carried forward in each of the tanks 6, 7, 8, and 9 which at the time serves for the regeneration of the spent washing fluid, whereas the clear fluid retained in the tank 69 goes off on the opening of the valve 70 to a pump 46 and from there to the tower 49.

The employment of the apparatus shown on the drawing proceeds approximately as follows:

It is assumed that the washing tower 1, 2, and 3 shall serve for the washing of the gas and the washing tower 4 for the regeneration of the spent washing liquid. In this case the valves of the pipe line 15, 15a are so adjusted that the washing fluid from the tank 8 flows off into the tank 6 and from the tank 6 into the tank 7. In this connection the tank 7 may be suitably charged periodically with liquid. The liquid remains in the tank 7 or tower 2 respectively, until the soluble metal compounds contained in the fluid are converted into insoluble metal sulphide. In case of need a certain quantity of ammonia, preferably in the form of concentrated ammoniacal liquor is added to the washing fluid in tank 7.

The perfectly spent washing fluid i. e. freed from metalthionates goes forward from the tank 7 through the valves of the pipe line 16, being suitably adjusted in the contrivance 39, where it is divided off from insoluble matter. One part of clear washing fluid is now led forward through the pipe line 14 to the tank 9, in which also the insoluble bodies separated out in contrivance 39 are carried forward together with the quantity of ammonia required for dissolving the sulphur precipitated on the hurdles of the tower 4. The solution and the insoluble bodies are carried forward by means of the pump 10 into the tower 4. In same, the fluid comes into contact with the sulphur dioxide gas from the pipe line 32 which during this period is shut-off from the other washers. As soon as insoluble bodies contained in the washing fluids are converted into soluble thionates, the liquid is carried back through the pipe line 15 or 15a again to the receiver 8 and then again is reused in circulation for the purpose of purifying gas.

After a certain time which is arrived at after having experienced in the running of the apparatus, the valves of the gas pipe line 17 and the sulphur dioxide gas pipe line 32 are so adjusted that for the purpose of washing the gas the washers 1, 2, and 4 are employed and for regenerating the spent liquid of the washer 3. This change-over is later repeated in such a way that then the regeneration is effected also in the washing tower 2 and then in the washing tower 1.

In such a way it is possible that all the washing towers 1, 2, 3, and 4 can interchangeably be used for the regeneration of the fouled washing solutions by which occasion as already explained above, the solid bodies deposited are dissolved.

The apparatus shown on the drawing can without any further adjustment also be used for carrying out the polythionate process, i. e. such a one by which the purification of the gas can make use of a washing fluid consisting preferably of ammonium polythionates. However, in this case the use of a contrivance 39 is dispensed with and the spent liquid is carried forward from the respective liquid tank of the tanks 6, 7, 8, and 9 into the liquid tank belonging to the regenerating tower.

I wish it to be understood that I have given above a particular form of carrying out my present invention. I do not wish, however, that my invention should be confined to this special manner of carrying out same. It may be varied in any way within the scope of the claims hereinafter set forth.

I claim:

1. In the method of removing hydrogen sulphide in combination with ammonia from gases comprising washing the gas with a thionate solution to remove hydrogen sulphide therefrom and regenerating the spent solution with sulphur dioxide in separate chambers therefor, the improvement comprising periodically discontinuing the washing of gas in the chamber in which the gas is being washed and the regeneration in the chamber in which the regeneration is being conducted and resuming the gas washing in the chamber in which the regeneration has just been discontinued and the regeneration with sulphur dioxide in the chamber in which gas washing has just been discontinued, thereby dissolving precipitated solids that may have clogged in the discontinued gas washing chamber.

2. In the method of removing hydrogen sulphide in combination with ammonia from gases comprising washing the gas with a thionate solution to remove hydrogen sulphide therefrom and regenerating the spent solution with sulphur dioxide in separate chambers therefor, the improvement comprising periodically discontinuing the washing of gas in the chamber in which the regeneration is being conducted and resuming the gas washing in the chamber in which the regeneration has just been discontinued and the regeneration with sulphur dioxide and added ammonia in the chamber in which gas washing has just been discontinued, thereby dissolving precipitated solids that may have clogged in the discontinued gas washing chamber.

CHRISTIAN JOHANNES HANSEN.